United States Patent [19]

Ohnishi

[11] Patent Number: 4,550,872
[45] Date of Patent: Nov. 5, 1985

[54] FILLET-WELDING EQUIPMENT FOR PIPE MATERIALS

[75] Inventor: Yutaka Ohnishi, Akishima, Japan

[73] Assignee: Tachikawa Spring Co., Ltd., Tokyo, Japan

[21] Appl. No.: 558,527

[22] Filed: Dec. 6, 1983

[30] Foreign Application Priority Data

Dec. 9, 1982 [JP] Japan ............................ 57-186304[U]

[51] Int. Cl.[4] ..................... B23K 31/06; B23K 37/02; B23K 37/04
[52] U.S. Cl. ........................................ 228/48; 269/41; 269/61; 219/125.11
[58] Field of Search ................... 228/45, 47, 48, 49 A; 269/41, 61; 219/60 A, 60 R, 125.11, 125.12

[56] References Cited

U.S. PATENT DOCUMENTS

| | | | |
|---|---|---|---|
| 3,970,232 | 7/1976 | Melton | 228/48 |
| 4,040,557 | 8/1977 | Heverly | 228/9 |
| 4,248,371 | 2/1981 | Melton | 228/48 |
| 4,271,346 | 6/1981 | Hardy | 228/48 |

FOREIGN PATENT DOCUMENTS 598751   3/1978   U.S.S.R. ............................ 228/45

Primary Examiner—Kenneth J. Ramsey
Assistant Examiner—M. Jordan
Attorney, Agent, or Firm—Cushman, Darby & Cushman

[57] ABSTRACT

A novel and improved fillet welding equipment is disclosed which comprises a movable member adapted to be movable longitudinally of the welding equipment, a threaded shaft inclined forwardly and mounted to the movable member, a welding torch threadedly connected with the threaded shaft to be movable upwardly or downwardly in a direction of inclination of said threaded shaft, and a jig positioned in front of the welding torch to carry members to be welded and adapted to be rotatable longitudinally of the welding equipment, whereby the whole periphery of the pipe member to be welded can be completely welded by a single welding torch.

4 Claims, 3 Drawing Figures

FILLET-WELDING EQUIPMENT FOR PIPE MATERIALS

BACKGROUND OF THE INVENTION

1. Field of the Invention

The present invention relates to a fillet-welding equipment for butting a pipe material such as a pipe against a plate-like surface and then fillet-welding it over its entire outer periphery.

2. Description of the Prior Art

Conventionally, in one type of fillet-welding equipment for pipe materials, after one half round of a circular peiphery of a pipe to be welded is first welded, it is necessary to interrupt such welding operation temporarily and reverse the material to be welded before resuming the welding operation for the other remaining half round of the periphery to be welded. This forced interruption consumes more time and also results in an unsatisfactory working efficiency.

In another type of such welding equipment, two welding torches are provided such that their respective nozzles are facing to each other. One of the welding torches is used to weld one half round of a portion to be welded and the other welding torch is used to weld the other remaining half portion, thereby eliminating the need for reversal of the material to be welded. However, this type of fillet-welding equipment is large in size and is thus restricted by space, i.e., its location to be installed is limited.

SUMMARY OF THE INVENTION

The fillet-welding equipment of the present invention aims at eliminating the above mentioned drawbacks found in the prior art welding equipments.

Accordingly, the principal object of the invention is to provide a fillet-welding equipment which uses a single welding torch to complete a continuous welding over the entire peripheries of pipe materials such as circular pipes and which at the same time can reduce the time necessary for welding such materials.

It is another object of the invention to provide a fillet-welding equipment which is not so large in size as the conventional welding equipment that employs a plurality of welding torches to weld successively the whole periphery of a circular pipe material or the like to be welded.

In order to achieve the above objectives, this invention provides a novel fillet-welding equipment in which a jig is used to rotate a pipe member being welded and a welding torch is moved fore and aft as well as vertically relative to the pipe member being welded so as to perform a continuous welding operation over the entire periphery of the pipe member to be welded.

Specifically, according to the fillet-welding equipment of the invention, a substantial portion of the entire periphery of the member being welded in the range of 340 degrees can be first welded by moving the welding torch forwardly toward the member to be welded and by rotating the member to be welded along with the jig, while the remaining portion of such member in the range of 20 degrees can be welded by moving the welding torch upwardly or downwardly after welding of such substantial portion. In this manner, the present invention can complete a fillet-welding operation over the whole periphery of the pipe member to be welded, i.e., over the full range of 360 degrees.

Accordingly, the present invention can eliminate the need for interrupting a welding operation after welding of the half round of the entire periphery to be welded and reversing the member being welded as in the prior art welding equipment.

Also, the fillet-welding equipment of the invention is more compact, that is, substantially smaller in size than the conventional fillet-welding equipment employing a plurality of welding torches and thus can be applied more widely with less restriction for its installation space.

BRIEF DESCRIPTION OF THE DRAWINGS

The invention will be explained with reference to the accompanying drawings illustrating a preferred embodiment of the invention.

DETAILED DESCRIPTION OF A PREFERRED EMBODIMENT OF THE INVENTION

Figure 1:
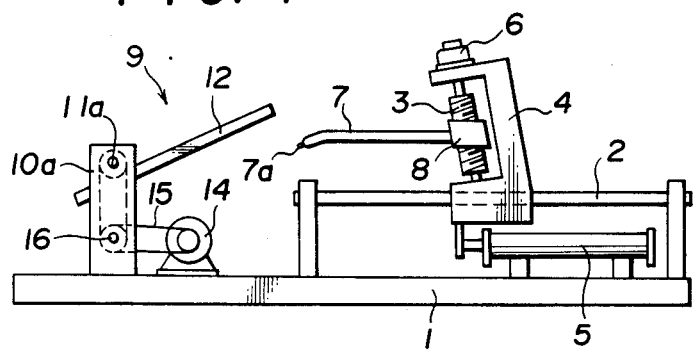
FIG. 1 is a side view of a welding equipment constructed in accordance with the invention.

This welding equipment, shown in the drawings as a preferred embodiment of the invention, is used to weld a center pipe formed of a pipe material and provided in a seat frame for a vehicle seat.

Specifically, FIG. 1 illustrates a welding equipment constructed in accordance with the invention. In the drawings, (1) designates a base body of the welding equipment. In the rear half section of this base body (1) is installed a longitudinally-extending guide member (2), on which guide member (2) there is mounted a longitudinally-movable movable member (4) which is inclined forwardly and supports a threaded shaft (3). The movable member (4) is adapted to be moved fore and aft, i.e., longitudinally of the welding equipment along the guide member (2) by a cylinder (5) provided in the base body (1), and is provided on its top surface with a motor (6) for rotatively driving the thread shaft (3). The threaded shaft (3) mounted to the movable member (4) supports a welding torch (7) by means of a support member (8) which is threadedly connected with the screw shaft (3) such that it can be moved vertically. The welding torch (7) can be moved upwardly or downwardly by means of rotation of the threaded shaft (3).

Figure 2:
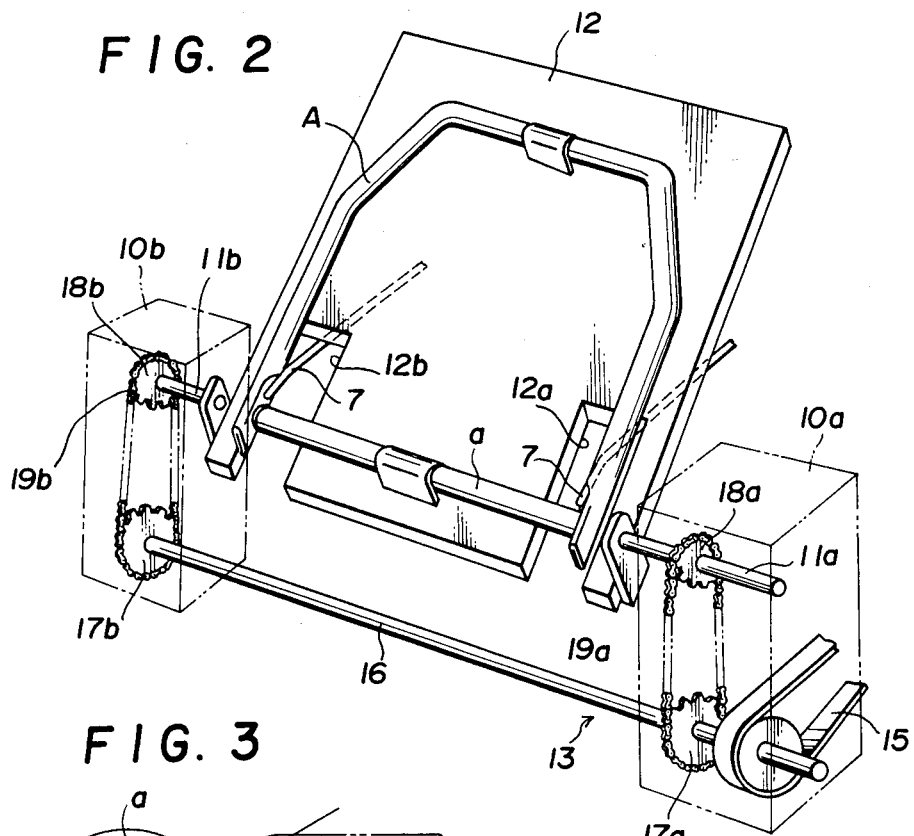
FIG. 2 is a perspective view of main portions of the welding equipment shown in FIG. 1; and, FIG. 3 is an explanatory view illustrating how the welding equipment of the invention achieves its welding operation.

Reference numeral (9) represents a supporting mechanism provided in the front half section of the base body (1) for supporting a member to be welded. This support mechanism (9) is composed of a jig (12) rotatably carried on supporting boxes (10a)(10b) through shafts (11a)(11b) and a rotation mechanism (13) for rotating such jig (12). Such rotational mechanism (13) comprises; first set of chain gears (17a)(17b) and second set of chain gears (18a)(18b), which are respectively mounted to a shaft of rotation (16) connected to further motor (14) through a belt (15) and to the shafts (11a)(11b) of the jig (12) in a manner that both sets of chain gears are opposed to each other; and chains (19a) and (19b) which are respectively extended over the gears (17a)(18a) and (17b)(18b), (FIG. 2).

In this embodiment, since it is used for welding a center pipe (a) relative to a seat frame A, the jig (12) is formed with cut-away portions (12a)(12b) in its positions corresponding to both ends of the center pipe (a), while its portions journalled by its two shafts (11a)(11b) are substantially aligned with the axial direction of the center pipe (a).

Next, we will describe the operation of the welding equipment constructed as above.

Figure 3:
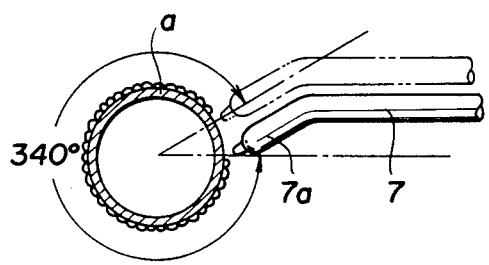

First, a seat frame A and a center pipe (a) to be welded to the seat frame A are set to a jig (12). In this state, a movable body (4) is moved forward along a guide member (2) by a cylinder (5) and a nozzle (7a) of a welding torch (7) is guided from cut-away portions (12a)(12b) of the jig (12) to its operative position, or, the nozzle (7a) is caused to face the end of the center pipe (a), i.e., the portion to be welded to the seat frame A. In such state, with the jig (12) being rotated by means of a rotation mechanism (13) by a motor (14), welding flame is jetted from the nozzle (7a) of the welding torch (7) so that the seat frame A and the center pipe (a) are welded to each other in a circular form. In this condition, the welding in the range of approx. 340 degrees has been completed. Shafts (11a, 11b) and shaft (16) are separated sufficiently to allow rotation of jig. (12) therebetween. If the jig (12) is further rotated, then it would be abutted against the welding torch (7) and thus would be unable to rotate. Therefore, in this position, the jig (12) is stopped to rotate. Then, with the jig (12) being stopped to rotate, a motor (6) mounted to the movable member (4) is driven to rotate a threaded shaft (3) so as to move the welding torch (7) by means of the movable member (4) upwardly. Since the threaded shaft (3) is inclined forwardly, this upward movement of the welding torch (7) causes the welding torch (7) to move forward as well while it is moved upwardly. Thus, the welding torch (7) can move in the range of about 20 degrees so that the remaining portion to be welded in the range of approx. 20 degrees can be welded (FIG. 3).

In this manner, the illustrated welding equipment of the invention is able to weld continuously a circular member to be welded over its entire periphery.

As described hereinbefore, according to the invention, a jig together with a pipe member and a plate-like member set thereto can be first rotated in the substantial range of the whole periphery of the pipe member, up to its critical point beyond which the jig cannot be rotated any further so as to carry out a substantially circular welding for such two members within such substantial range. A remaining range of the periphery can be welded by moving a welding torch. In this manner, the welding equipment of the invention can weld a circular portion to be welded over its entire periphery in succession and thus can eliminate the need for replacement of the members to be welded relative to the jig, which results in the reduced welding time and improved working efficiency.

Also, according to the invention, a single torch can be used to complete a welding operation for one region to be welded. This permits simplification of the construction of the welding equipment and thus reduction of its cost. This also allows production of a compact welding equipment which will not be restricted by its place of installation.

What is claimed is:

1. A fillet welding equipment for welding pipe materials, the fillet welding equipment comprising:
   (a) a movable member adapted to be movable longitudinally of a base body of said welding equipment;
   (b) a threaded shaft inclined forwardly and mounted rotatably to said movable member;
   (c) a welding torch threadedly connected with said threaded shaft to be movable upwardly or downwardly in a direction of inclination of said threaded shaft; and,
   (d) a jig positioned in front of said welding torch to carry members to be welded rotatably mounted on said base body of said welding equipment.

2. The fillet welding equipment as recited in claim 1, wherein said movable member is moved longitudinally along a guide member by a cylinder provided in a base body of said welding equipment.

3. The fillet welding equipment as recited in claim 1, wherein said threaded shaft is mounted to said movable member such that its upper portion is inclined forwardly and also is adapted to be rotated by a motor so as to move said welding torch upwardly or downwardly.

4. The fillet welding equipment as recited in claim 1, wherein said jig is supported by supporting boxes provided in said base body by means of a pair shaft which can be rotated by a motor and also is provided with cut-away portions located at its portions corresponding to the portions to be welded of said members to be welded so that said welding torch can be guided therein.

* * * * *